United States Patent
Sasada et al.

(10) Patent No.: US 11,180,647 B2
(45) Date of Patent: Nov. 23, 2021

(54) POLYVINYL CHLORIDE-BASED RIGID MOLDED PRODUCTS AND METHOD FOR MANUFACTURING THE SAME

(71) Applicant: Shin-Etsu Chemical Co., Ltd., Tokyo (JP)

(72) Inventors: Yoshihito Sasada, Kamisu (JP); Toshiki Kawabata, Kamisu (JP); Junichi Kawashima, Kamisu (JP); Osamu Matsumoto, Kamisu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/108,345

(22) Filed: Aug. 22, 2018

(65) Prior Publication Data

US 2019/0062543 A1 Feb. 28, 2019

(30) Foreign Application Priority Data

Aug. 24, 2017 (JP) .............................. JP2017-160836

(51) Int. Cl.

| | | |
|---|---|---|
| *C08L 27/06* | (2006.01) | |
| *C08K 3/26* | (2006.01) | |
| *C08K 9/04* | (2006.01) | |
| *B29C 45/00* | (2006.01) | |
| *B29C 69/02* | (2006.01) | |
| *C08J 3/20* | (2006.01) | |
| *B29K 27/06* | (2006.01) | |
| *B29L 7/00* | (2006.01) | |
| *B29L 23/00* | (2006.01) | |
| *C08K 5/09* | (2006.01) | |

(52) U.S. Cl.
CPC .......... *C08L 27/06* (2013.01); *B29C 45/0001* (2013.01); *B29C 69/02* (2013.01); *C08J 3/203* (2013.01); *C08K 3/26* (2013.01); *C08K 9/04* (2013.01); *B29C 2948/92266* (2019.02); *B29K 2027/06* (2013.01); *B29L 2007/002* (2013.01); *B29L 2023/22* (2013.01); *C08F 2500/02* (2013.01); *C08F 2500/24* (2013.01); *C08J 2327/06* (2013.01); *C08K 5/09* (2013.01); *C08K 2003/265* (2013.01); *C08K 2201/005* (2013.01)

(58) Field of Classification Search
CPC .. C08L 27/06; C08K 3/26; C08K 9/04; B29C 45/00; B29C 69/02

USPC ......................................................... 524/425
See application file for complete search history.

(56) References Cited

U.S. PATENT DOCUMENTS

| | | | | |
|---|---|---|---|---|
| 3,407,171 A | * | 10/1968 | Segre ........................ | C08K 3/26 524/425 |
| 4,983,046 A | * | 1/1991 | Murata ............... | B01F 7/00008 241/199.12 |
| 2005/0131123 A1 | * | 6/2005 | Hawrylko ................ | C08K 3/26 524/425 |
| 2012/0309877 A1 | * | 12/2012 | Fujiwara ............... | C01F 11/185 524/301 |

FOREIGN PATENT DOCUMENTS

| | | | |
|---|---|---|---|
| CN | 106751229 A | | 5/2017 |
| JP | S5747340 | * | 3/1982 |
| JP | S64-063024 A | | 3/1989 |
| JP | H04208419 | * | 7/1992 |
| JP | 2000-26686 A | | 1/2000 |
| JP | 2003-105149 A | | 4/2003 |
| JP | 3462486 B2 | | 11/2003 |
| JP | 2014-231565 A | | 12/2014 |
| JP | 2014231565 | * | 12/2014 |

OTHER PUBLICATIONS

George Matthews and George S. Plemper, Effects of calcium carbonate fillers on the behaviour of PVC in fires, Polytechnic of the South Bank, London, Published 1980.*
Extended European Search Report dated Jan. 2, 2019, issued in counterpart European Patent application 18189405.6 (8 pages).
Office Action dated Mar. 2, 2021, issued in counterpart JP Application No. 2018-139929, with English Translation. (5 pages).

* cited by examiner

*Primary Examiner* — Deve V Hall
(74) *Attorney, Agent, or Firm* — Westerman, Hattori, Daniels & Adrian, LLP

(57) ABSTRACT

The present invention provides a polyvinyl chloride-based rigid molded product containing 10 to 40 parts by weight of calcium carbonate having an average primary particle size of 0.01 to 0.3 μm per 100 parts by weight of a polyvinyl chloride-based resin having an average polymerization degree of 500 to 1,500, wherein a variation coefficient of the number of calcium carbonate particles in partitioning analysis of a cross section of the molded product is 15% or less, and a method for manufacturing the same.

7 Claims, No Drawings

POLYVINYL CHLORIDE-BASED RIGID MOLDED PRODUCTS AND METHOD FOR MANUFACTURING THE SAME

CROSS-REFERENCE TO RELATED APPLICATION

This non-provisional application claims priority under 35 U.S.C. § 119(a) on Patent Application No. 2017-160836 filed in Japan on Aug. 24, 2017, the entire contents of which are hereby incorporated by reference.

TECHNICAL FIELD

The present invention relates to a polyvinyl chloride-based rigid molded product containing calcium carbonate and a method for manufacturing the same.

BACKGROUND ART

Conventionally, a rigid molded product by polyvinyl chloride has been molded by a method such as extrusion molding, press molding, injection molding, or calender molding, and has been widely used for various products such as a pipe, a joint, a drainage basin, a gutter, a window frame, a siding, a film-sheet material, a flat plate, and a corrugated plate.

In these molded products, a methyl methacrylate-butadiene-styrene graft copolymer (MBS resin), an acrylic polymer, or the like is often used as an impact modifier. Examples thereof include Patent Document 1 listed below. However, compounding of the above impact modifier causes a problem such as a decrease in softening temperature, and further causes an increase in cost.

Examples of compounding calcium carbonate and a plasticizer with polyvinyl chloride include the following Patent Document 2. However, polyvinyl chloride causes a problem such as a decrease in softening temperature due to addition of a plasticizer, resulting in a problem that the polyvinyl chloride cannot withstand a load at high temperature. Furthermore, use of a plasticizer causes an increase in cost. The following Patent Document 3 describes that calcium carbonate is compounded with polyvinyl chloride to increase impact strength. However, calcium carbonate has a large particle size distribution, and therefore a molded product has low Charpy impact strength. It is difficult to apply this formulation to application products. At present, it is difficult to obtain high impact strength without using proper processing conditions (temperature and time) or a specific composition.

CITATION LIST

Patent Document 1: JP-A 2014-231565
Patent Document 2: JP-B2 3462486
Patent Document 3: JPA 2000-026686

DISCLOSURE OF INVENTION

The present invention has been achieved in view of the above circumstances. An object of the present invention is to provide a polyvinyl chloride-based rigid molded product having excellent impact resistance without using an impact modifier or a plasticizer causing a decrease in softening temperature and an increase in cost, and a method for manufacturing the same.

As a result of intensive studies to achieve the above object, the present inventors have found that when a polyvinyl chloride-based rigid molded product containing 10 to 40 parts by weight of calcium carbonate having an average primary particle size of 0.01 to 0.3 μm per 100 parts by weight of a polyvinyl chloride-based resin having an average polymerization degree of 500 to 1,500 has a variation coefficient of the number of calcium carbonate particles of 15% or less in partitioning analysis of a cross section of the molded product, by uniformly dispersing calcium carbonate, a polyvinyl chloride-based rigid molded product having sufficiently high impact resistance can be obtained without a decrease in softening temperature, and have completed the present invention.

Therefore, the present invention provides the following polyvinyl chloride-based rigid molded product and a method for manufacturing the same.

[1] A polyvinyl chloride-based rigid molded product containing 10 to 40 parts by weight of calcium carbonate having an average primary particle size of 0.01 to 0.3 μm per 100 parts by weight of a polyvinyl chloride-based resin having an average polymerization degree of 500 to 1,500, wherein a variation coefficient of the number of calcium carbonate particles in partitioning analysis of a cross section of the molded product defined below is 15% or less.

<Variation Coefficient of the Number of Calcium Carbonate Particles in Partitioning Analysis>

The variation coefficient of the number of calcium carbonate particles in the partitioning analysis is a value calculated by dividing a field of view of a cross section of a molded product into sections, counting the number of calcium carbonate particles in each section, and dividing the standard deviation of the number of particles by the average number of particles in the sections.

[2] The polyvinyl chloride-based rigid molded product according to [1], wherein a Charpy impact strength at 23±2° C. is 30 kJ/m² or more.

[3] The polyvinyl chloride-based rigid molded product according to [1,] wherein the calcium carbonate has been subjected to a fatty acid surface treatment in advance.

[4] The polyvinyl chloride-based rigid molded product according to [1], used for a product selected from the group consisting of a pipe, a joint, a drainage basin, a gutter, a window frame, a siding, a film-sheet material, a flat plate, and a corrugated plate.

[5] A method for manufacturing a polyvinyl chloride-based rigid molded product, including: mixing 10 to 40 parts by weight of calcium carbonate having an average primary particle size of 0.01 to 0.3 μm per 100 parts by weight of a polyvinyl chloride-based resin having an average polymerization degree of 500 to 1,500 at a rotational speed of 500 to 3,000 rpm using a rotary mixer; and molding this resin mixture by a molding method selected from the group consisting of extrusion molding, press molding, injection molding, and calender molding to manufacture a polyvinyl chloride-based rigid molded product, wherein a variation coefficient of the number of calcium carbonate particles in partitioning analysis of a cross section of the molded product is 15% or less.

ADVANTAGEOUS EFFECTS OF THE INVENTION

The polyvinyl chloride-based rigid molded product according to the present invention has excellent dispersibility of calcium carbonate, has excellent impact resistance without a decrease in softening temperature, and is used advantageously for various applications.

DESCRIPTION OF THE PREFERRED EMBODIMENT

Hereinafter, the present invention is described in more detail.

A polyvinyl chloride-based rigid molded product according to the present invention contains a predetermined amount of calcium carbonate having a predetermined average primary particle size in a polyvinyl chloride-based resin having an average polymerization degree of 500 to 1,500.

The polyvinyl chloride-based resin used in the present invention is a vinyl chloride homopolymer, a copolymer of a vinyl chloride monomer and a monomer copolymerizable with vinyl chloride (usually a copolymer containing 50% by weight or more of vinyl to chloride), or a chlorinated vinyl chloride copolymer. Examples of the monomer copolymerizable with vinyl chloride include a vinyl ester such as vinyl acetate or vinyl propionate, acrylic acid, an acrylate such as ethyl acrylate, a methacrylate such as methyl methacrylate or ethyl methacrylate an olefin monomer such as ethylene or propylene, acrylonitrile, styrene, and vinylidene chloride. The polyvinyl chloride-based resin has an average polymerization degree of 500 to 1,500, preferably of 700 to 1,300. With the average polymerization degree of less than 500, impact strength is low, and requirement cannot be satisfied. With the average polymerization degree of more than 1,500, melt viscosity is high and molding is difficult without a plasticizer. It is noted that the average polymerization degree of the polyvinyl chloride-based resin is a value measured by a solution viscosity method defined in JIS K7367-2.

Calcium carbonate used in the present invention has an average primary particle size of 0.01 to 0.3 µm, preferably of 0.05 to 0.2 µm. When the average primary particle size of calcium carbonate is within the above range, impact resistance of the polyvinyl chloride-based resin can be improved. As the particle size of calcium carbonate decreases, the specific surface area thereof increases significantly, and it is considered that impact stress is diffused, and a microcraze is generated at a filler interface to absorb strain energy in a case where impact is applied. It is noted that the average primary particle size of calcium carbonate is measured by a transmission electron microscope photograph observation method.

In particular, as the calcium carbonate, calcium carbonate which has been subjected to surface treatment in advance and hardly agglomerates is preferably adopted. In this case, a surface-treated calcium carbonate has an average primary particle size of 0.01 to 0.3 µm. In a case of using calcium carbonate which has not been subjected to surface treatment, agglomeration tends to occur. When calcium carbonate agglomerates, an impact strength improving effect may be insufficient. In addition, it is desirable that calcium carbonate particles are dispersed in a vinyl chloride resin formulation uniformly. Therefore, it is desirable that calcium carbonate has been subjected to fatty acid surface treatment.

The fatty acid used in the surface treatment is preferably a higher fatty acid having 10 to 20 carbon atoms. Specifically, a fatty acid such as stearic acid, palmitic acid, lauric acid, or oleic acid is preferably used, and two or more kinds thereof may be mixed and used. Incidentally, as the fatty acid, not only a fatty acid but also a fatty acid salt with an alkali metal such as sodium or calcium, an alkaline earth metal, or the like, or a fatty acid ester may be used.

The compounding amount of calcium carbonate is 10 to 40 parts by weight, and preferably 15 to 25 parts by weight per 100 parts by weight of a polyvinyl chloride-based resin. When the compounding amount of calcium carbonate is within the above range, impact resistance of a polyvinyl chloride-based resin can be improved. When the compounding amount of calcium carbonate is too small, an impact strength improving effect is hardly exhibited. Conversely, when the compounding amount is too large, it is difficult for calcium carbonate to be uniformly dispersed, agglomeration thereof progresses, and a craze is generated at an interface of the calcium carbonate having a large particle size. As a result, it is considered that strain energy cannot be fully absorbed to cause break easily.

To the polyvinyl chloride-based rigid molded product used in the present invention, a heat stabilizer for a chlorine-containing resin may be added in addition to these substances. This heat stabilizer is used for preventing discoloration of a molded product or deterioration of the molded product due to cutting of a molecular chain by thermally decomposition of a chlorine-containing resin and release of hydrogen chloride when a chlorine-containing resin composition is subjected to molding processing. As the heat stabilizer, those conventionally used for a polyvinyl chloride-based rigid molded product can be used, and examples thereof include a metal compound such as calcium, barium, or zinc, a tin compound, and a lead compound. The compounding amount of the heat stabilizer is not particularly limited. However, the heat stabilizer can be used preferably in an amount of 20 parts by weight or less, more preferably in an amount of 1 to 10 parts by weight per 100 parts by weight of a polyvinyl chloride-based resin. A lubricant, a processing aid, an ultraviolet absorber, an antioxidant, a pigment, or the like may be added, if necessary. Each of these additives can be added in a range of 20 parts by weight or less.

The lubricant is not particularly limited, although it is preferably paraffin wax having the average molecular weight of from 300 to 1200. It is noted that the average molecular weight of paraffin wax is a value measured by gel permeation chromatography (GPC).

In the present invention, as described above, a predetermined amount of the polyvinyl chloride-based resin and a predetermined amount of calcium carbonate are compounded with each other. As a method for obtaining the resin mixture, by mixing the polyvinyl chloride-based resin and calcium carbonate at a specific rotational speed using a rotary mixer for molding, a molded product having high impact strength can be obtained without a decrease in softening temperature. Examples of the rotary mixer to be used include a Henschel mixer and a super mixer from a viewpoint of the present invention which enables connecting and uniformly mixing the resin composition.

The rotational speed of the rotary mixer is not particularly limited, but is preferably 500 to 3,000 rpm, and more preferably 1000 to 2,500 rpm. In a case where this rotational speed is less than 500 rpm, agglomeration of calcium carbonate occurs due to poor dispersion of calcium carbonate, and a molded product having high impact strength cannot be obtained in some cases. Conversely, in a case where the rotational speed exceeds 3,000 rpm, it may be difficult to uniformly control a mixing temperature due to excessive heat generation. At the time of stilling by the mixer, rotation mixing is performed at the temperature of compounding materials of 10 to 40° C., preferably of 2.0 to 30° C. When the temperature of the compounding materials reaches 100 to 140° C., preferably 110 to 130° C. by raising the temperature, the compounding materials are discharged to obtain a powder compound. In this case, the mixing time of the compounding materials can be set preferably to 0.05 to 1.0 hr, more preferably to 0.05 to 0.5 hr.

A method for molding the powder compound (resin mixture) (also referred to as "main molding") is not particularly limited, but is preferably selected from the group consisting of extrusion molding, press molding, injection molding, and calender molding.

Before the molding, the powder compound can be subjected to preliminary melt processing. Examples of this preliminary melt processing include a method using a product obtained by extrusion molding or roll molding and a method using a product obtained by pelletizing the molded product preferably to about 0.5 to 10 mm, more preferably to about 1 to 7 mm by chopping. Kneading is preferably performed at the preliminary melt processing set temperature of 140 to 200° C. for 2 to 12 minutes. In a case of preliminary melt processing using extrusion molding, for example, a powder compound is melted at 140 to 180° C. using an extrusion molding machine, a screw speed is controlled to 20 to 60 rpm such that a pellet has a length of about 0.5 to 10 mm in a longitudinal direction, and a pellet compound can be thereby obtained. In a case of roll molding, preferably, a powder compound is put into a two-roll (3 to 9 inches, for example, about 10 to 30 rpm) and kneaded at 160 to 200° C. for 1 to 30 minutes, preferably 1 to 10 minutes to form a sheet having a thickness of 0.1 to 5 mm. By performing preliminary melt processing under such conditions, it is considered that calcium carbonate can be more uniformly dispersed at the time of subsequent main molding of the resin mixture.

After the preliminary melt processing, by molding the powder compound by the various molding methods described above, a polyvinyl chloride-based rigid molded product as a main molded product can be obtained. As a specific example of this molding processing, by stacking and pressing 10 or less roll sheets (each having a thickness preferably of 0.1 to 5 mm) under preferable conditions of 150 to 250° C., pressure 10 to 100 kg/cm$^2$, and 1 to 30 minutes so as to obtain a desired shape, a pressed sheet (having a thickness preferably of 0.5 to 10 mm, more preferably of 3 to 5 mm) is molded to obtain a molded sheet. In main molding processing, not only press molding but also an extrusion molding method may be selected. In this case, a pelletized preliminary melted product is put into an extruder, control thereof is performed such that a resin temperature is 140 to 200° C. and a rotational speed is 20 to 60 rpm, and heading is performed to obtain an extrusion molded product such as a square rod or a sheet. The extrusion molding machine may be a single-screw machine or a multi-screw machine.

In partitioning analysis of a cross section of the polyvinyl chloride-based rigid molded product molded in the present invention, observed by a field emission type scanning electron microscope, a variation coefficient of the number of calcium carbonate particles is 15% or less, and preferably 1 to 10%. The variation coefficient of the number of calcium carbonate particles in the partitioning analysis is a value calculated by dividing a field of view of a cross section into sections, counting the number of calcium carbonate particles in each section, and dividing the standard deviation of the number of particles by the average number of particles in the sections. A case where the variation coefficient of the number of particles in the cross section of the molded article is within the above range means that calcium carbonate is uniformly dispersed, and impact strength is considered to be improved. In a case where the variation coefficient exceeds 15%, it is difficult to obtain high impact strength.

The polyvinyl chloride-based rigid molded product molded in the present invention has a Charpy impact strength preferably of 30 kJ/m$^2$ or more, more preferably of 40 to 140 kJ/m$^2$, still more preferably of 50 to 100 kJ/m$^2$. The Charpy impact strength is measured in accordance with JIS K7111 under a condition of 23±2° C. When the Charpy impact strength is less than 30 kJ/m$^2$, cracking easily occurs at the time of use.

In addition, the polyvinyl chloride-based rigid molded product can obtain a Vicat softening temperature of 90° C. or higher, preferably 90 to 100° C. at a test load of 10 N. Furthermore, by setting a melt viscosity (150 to 190° C.) of the molten polyvinyl chloride-based rigid molded product to $9.0 \times 10^2$ to $1.6 \times 10^4$ Pa·s, preferably $1.0 \times 10^3$ to $9.0 \times 10^3$ Pa·s, a good product is obtained in view of uniform kneadability.

It is noted that the molded product of the present invention can be preferably used for various industrial products such as a pipe, a joint, a drainage basin, a gutter, a window frame, a film-sheet material, a flat plate, and a corrugated plate. For these industrial products, impact strength (impact resistance) required varies depending on an environment to be used, and the impact strength is selected in consideration of a case where a product is cut at the time of processing.

EXAMPLES

Hereinafter, the present invention is described specifically with reference to Examples and Comparative Examples, but the present invention is not limited to the following Examples.

Example 1

<Preparation of Polyvinyl Chloride-Based Resin Compound>

To polyvinyl chloride "TK-1000 (having an average polymerization degree of 1,000)" manufactured by Shin-Etsu Chemical Co., Ltd., 20 parts by weight of calcium carbonate having an average primary particle size of 0.08 μm and 1 part by weight of paraffin wax having the average molecular weight of 500 were added. Using a 10 L Henschel mixer (Fm10C/1 type) manufactured by Nippon Coke & Engineering Co., Ltd. as a rotary mixer, compounding materials were added at compounding ratios (parts by weight) as illustrated in Table 1. The compounding materials were rotated and mixed at a temperature of 25° C. at a rotation number of 1,800 rpm, and discharged when the temperature of the compounding materials reached 120° C. by raising the temperature. Time required for blending was about six minutes. An ST blade (standard) was used as an upper blade, and an AO blade (standard) was used as a lower blade in the Henschel mixer.

<Preparation of Roll Sheet (Preliminary Melt Processing)>

The compound was kneaded with a 6 inch two-roll for five minutes by performing control under conditions of a roll temperature of 170° C. and 20 rpm to form a roll sheet having a thickness of 0.7 mm.

<Preparation of Pressed Sheet (Main Molding Processing)>
Charpy Impact Strength Measurement/Vicat Softening Temperature Measurement>

A roll sheet (having a thickness of 0.7 mm) was cut to a desired length, and six sheets were stacked and pressed under conditions of 180° C., pressure 50 kg/cm$^2$, and five minutes to obtain a pressed sheet having a thickness of 4 mm. By dividing the pressed sheet, 10 test pieces each having a size of 4 mm×10 mm×80 mm were prepared for a Charpy impact test, and two test pieces were prepared for a Vicat softening temperature test. Charpy impact strength was measured under a condition of 23° C.±2° C. in accordance with JIS K7111. A Vicat softening temperature was measured at a test load of 10 N and a temperature increasing rate of 50° C./hour in accordance with JIS K7206. Table 2 illustrates results of each measurement (Charpy impact strength average value n=10 and Vicat softening temperature average value n=2).

<Partitioning Analysis>

A cross section of a molded product was observed with a field emission type scanning electron microscope (SU9,000 manufactured by Hitachi High-Technologies Corporation) and divided into 100 sections in a field of view of 60 μm×40 μm. The number of calcium carbonate particles in each section was counted, and the average number of particles in 100 sections and a standard deviation were calculated. A variation coefficient was calculated by dividing the standard deviation by the average value and used as an index of distribution uniformity of calcium carbonate. A smaller value of the variation coefficient indicates a more uniform distribution. Table 2 illustrates an average of the values measured for five fields of view.

<Melt Viscosity>

The molded product obtained in each Example was melted at 160° C. Thereafter, melt viscosity (Pa·s) at a shear stress of 4 MPa was measured using a Koka type flow tester (CFT-500D manufactured by Shimadzu Corporation).

Example 2

The procedure was performed in a similar manner to that in Example 1 except that 20 parts by weight of calcium carbonate having an average primary particle size of 0.15 μm was added.

Example 3

<Preparation of Polyvinyl Chloride-Based Resin Compound>

Preparation was performed in a similar manner to that in Example 1.

<Preparation of Roll Sheet (Preliminary Melt Processing)>

Preparation was performed in a similar manner to that in Example 1.

<Preparation of Extrusion Molded Product (Main Molding Processing)/Charpy Impact Strength Measurement/Vicat Softening Temperature Measurement>

The roll sheet obtained in Example 1 was chopped into 5 mm square pellets using a sheet pelletizer (SGG-220-4×4) manufactured by HORAI CO., LTD. Thereafter, extrusion molding was performed using a 20 mmφ single-screw extruder at a screw compression ratio CR=3.0, with, a screen: #60×1 sheet, with a die: 4×10 mm square bar, at a screw rotation speed: 40 rpm, at cylinder setting temperatures of C1:180° C., C2:185° C., and C3:190° C. (C1 was closest to a hopper, and then the pellets passed in order of C2 and C3) at a die setting temperature of 200° C. Time required for kneading the resin from the cylinder to the die was about three minutes. By dividing the die square bar molded product from the cylinder, 10 test pieces each having a size of 4 mm×10 mm×80 mm were prepared for a Charpy impact test, and two test pieces were prepared for a Vicat softening temperature test. Charpy impact strength was measured under a condition of 23±2° C. in accordance with JIS K7111. A Vicat softening temperature was measured at a to test load of 10 N and a temperature increasing of 50° C./hour in accordance with JIS K7206. Table 2 illustrates each measurement result (average value).

<Partitioning Analysis Method>

Measurement was performed in a similar manner to that in Example 1.

<Melt Viscosity>

Measurement was performed in a similar manner to that in Example 1.

Example 4

The procedure was performed in a similar manner to that in Example 1 except that 15 parts by weight of calcium carbonate having an average primary particle size of 0.08 μm was added to polyvinyl chloride TK-700 (average polymerization degree 700 manufactured by Shin-Etsu Chemical Co., Ltd.), and the rotational speed of the Henschel mixer was 1,200 rpm.

Example 5

The procedure was performed in a similar manner to that in Example 1 except that 25 parts by weight of calcium carbonate having an average primary particle size of 0.08 μm was added to polyvinyl chloride TK-1300 (having an average polymerization degree of 1300) manufactured by Shin-Etsu Chemical Co., Ltd., and the rotational speed of the Henschel mixer was 2,400 rpm.

Example 6

The procedure was performed in a similar manner to that in Example 1 except that 20 parts by weight of calcium carbonate having an average primary particle size of 0.05 μm was added.

Example 7

The procedure was performed in a similar manner to that in Example 1 except that 35 parts by weight of calcium carbonate having an average primary particle size of 0.08 μm was added and the pressing temperature was 190° C.

Example 8

The procedure was performed in a similar manner to that in Example 1 except that 15 parts by weight of calcium carbonate having an average primary particle size of 0.15 μm was added and the pressing temperature was 190° C.

Example 9

The procedure was performed in a similar manner to that in Example 1 except that paraffin wax having the average molecular weight of 700 was used.

Comparative Example 1

The procedure was performed in a similar manner to that in Example 1 except that 50 parts by weight of calcium carbonate having an average primary particle size of 0.08 μm was added.

Comparative Example 2

The procedure was performed in a similar manner to that in Example 1 except that 50 parts by weight of calcium carbonate having an average primary particle size of 0.15 μm was added.

Comparative Example 3

The procedure was performed in a similar manner to that in Example 1 except that 20 parts by weight of calcium carbonate having an average primary particle size of 1.2 μm was added.

Comparative Example 4

The procedure was performed in a similar manner to that in Example 1 except that calcium carbonate was not added.

Comparative Example 5

The procedure was performed in a similar manner to that in Example 1 except that polyvinyl chloride TK-2,000E (having an average polymerization degree of 2000) manufactured by Shin-Etsu Chemical Co., Ltd. was used.

Comparative Example 6

The procedure was performed in a similar manner to that in Example 1 except that 7 parts by weight of calcium carbonate having an average primary particle o size f 0.08 μm was added.

Comparative Example 7

The procedure was performed in a similar manner to that in Example 1 except that the rotational speed of the Henschel mixer was 400 rpm.

Comparative Example 8

The procedure was performed in a similar manner to that in Example 1 except that 20 parts by weight of calcium carbonate having an average primary particle size of 0.7 μm was added.

TABLE 1

| Compounding material | Contents | Parts by weight |
|---|---|---|
| Polyvinyl chloride | Average polymerization degree (see Tables 2 and 3) | 100 |
| Stabilizer | Sn-based stabilizer<br>Octyl tin mercapto and butyl tin sulfide | 2 |
| | Ca soap (calcium stearate) | 2 |
| Lubricant | Paraffin wax Average molecular weight (see Tables 2 and 3) | 1 |
| | Polyethylene wax (oxidization type) | 0.15 |
| Calcium carbonate | Any one of<br>precipitated colloidal calcium carbonate surface-treated with a fatty acid and having an average primary particle size of 0.08 μm,<br>precipitated colloidal calcium carbonate surface-treated with a fatty acid and having an average primary particle size of 0.15 μm,<br>heavy calcium carbonate surface-treated with a fatty acid and having an average primary particle size of 1.2 μm, and<br>heavy calcium carbonate having an average primary particle size of 0.7 μm which is not surface-treated with a fatty acid. | (See Tables 2 and 3) |

*The fatty acid used for the surface treatment of calcium carbonate is a mixture of fatty acids typified by stearic acid, palmitic acid, lauric acid, and oleic acid.

TABLE 2

| | Example | | | | | | | | |
|---|---|---|---|---|---|---|---|---|---|
| | 1 | 2 | 3 | 4 | 5 | 6 | 7 | 8 | 9 |
| Polymerization degree of polyvinyl chloride | 1,000 | 1,000 | 1,000 | 700 | 1,300 | 1,000 | 1,000 | 1,000 | 1,000 |
| Parts of calcium carbonate (parts by weight) | 20 | 20 | 20 | 15 | 25 | 20 | 35 | 15 | 20 |
| Particle size of calcium carbonate (μm) | 0.08 | 0.15 | 0.08 | 0.08 | 0.08 | 0.05 | 0.08 | 0.15 | 0.08 |
| Paraffin wax Average molecular weight | 500 | 500 | 500 | 500 | 500 | 500 | 500 | 500 | 700 |
| Mixer rotation speed (rpm) | 1,800 | 1,800 | 1,800 | 1,200 | 2,400 | 1,800 | 1,800 | 1,800 | 1,800 |
| Preliminary melt processing | Roll | Roll | Roll | Roll | Roll | Roll | Roll | Roll | Roll |
| Main molding processing | Pressing at 180° C. | Pressing at 180° C. | Single-screw extrusion | Pressing at 180° C. | Pressing at 180° C. | Pressing at 180° C. | Pressing at 190° C. | Pressing at 190° C. | Pressing at 180° C. |
| Charpy impact strength (kJ/m$^2$) | 76 | 74 | 83 | 65 | 77 | 55 | 54 | 66 | 74 |

TABLE 2-continued

| | Example | | | | | | | | |
|---|---|---|---|---|---|---|---|---|---|
| | 1 | 2 | 3 | 4 | 5 | 6 | 7 | 8 | 9 |
| Vicat softening temperature (° C.) | 91 | 91 | 91 | 90 | 92 | 91 | 93 | 90 | 91 |
| Variation coefficient of the number of particles (%) | 7.3 | 13.5 | 7.5 | 7.2 | 7.6 | 13.6 | 13.7 | 10.4 | 7.6 |
| Melt viscosity (Pa · s) | $2.8 \times 10^3$ | $3.1 \times 10^3$ | $3.2 \times 10^3$ | $2.7 \times 10^3$ | $2.9 \times 10^3$ | $2.9 \times 10^3$ | $4.1 \times 10^3$ | $2.8 \times 10^3$ | $2.7 \times 10^3$ |

TABLE 3

| | Comparative Example | | | | | | | |
|---|---|---|---|---|---|---|---|---|
| | 1 | 2 | 3 | 4 | 5 | 6 | 7 | 8 |
| Polymerization degree of polyvinyl chloride | 1,000 | 1,000 | 1,000 | 1,000 | 2,000 | 1,000 | 1,000 | 1,000 |
| Parts of calcium carbonate (parts by weight) | 50 | 50 | 20 | None | 20 | 7 | 20 | 20 |
| Particle size of calcium carbonate (μm) | 0.08 | 0.15 | 1.2 | — | 0.08 | 0.08 | 0.08 | 0.70 |
| Paraffin wax Average molecular weight | 500 | 500 | 500 | 500 | 500 | 500 | 500 | 500 |
| Mixer rotation speed (rpm) | 1,800 | 1,800 | 1,800 | 1,800 | 1,800 | 1,800 | 400 | 1,800 |
| Preliminary melt processing | Roll | Roll | Roll | Roll | Roll ↓ Processing is impossible | Roll | Roll | Roll |
| Main molding processing | Pressing at 180° C. | Pressing at 180° C. | Pressing at 180° C. | Pressing at 180° C. | — | Pressing at 180° C. | Pressing at 180° C. | Pressing at 180° C. |
| Charpy impact strength (kJ/m²) | 18 | 16 | 12 | 6 | — | 17 | 11 | 16 |
| Vicat softening temperature (° C.) | 94 | 94 | 91 | 87 | — | 88 | 91 | 91 |
| Variation coefficient of the number of particles (%) | 22.8 | 38.1 | 68.4 | — | — | 9.2 | 29.2 | 55.1 |
| Melt viscosity (Pa · s) | $5.2 \times 10^3$ | $5.3 \times 10^3$ | $2.3 \times 10^3$ | $1.5 \times 10^3$ | — | $2.1 \times 10^3$ | $3.0 \times 10^3$ | $3.3 \times 10^3$ |

The results of Table 2 (Examples) and Table 3 (Comparative Examples) indicate that the molded products in the present Examples in which the variation coefficient of the number of particles in partitioning analysis processing of a cross section of a molded product is 15% or less, calcium carbonate can be uniformly dispersed in polyvinyl chloride, and impact strength of 30 kJ/m² or more can be obtained without a decrease in softening temperature. It is noted that a molded product which has been subjected to preliminary melt processing with a roll and press molding, described in the above Examples, can be applied to a sheet material and a flat plate.

Japanese Patent Application No. 2017-160836 is incorporated herein by reference.

Although some preferred embodiments have been described many modifications and variations may be made thereto in light of the above teachings. It is therefore to be understood that the invention may be practiced otherwise than as specifically described without departing from the scope of the appended claims.

The invention claimed is:

1. A polyvinyl chloride-based rigid molded product comprising 10 to 40 parts by weight of calcium carbonate having an average primary particle size of 0.01 to 0.3 μm per 100 parts by weight of a polyvinyl chloride-based resin having an average polymerization degree of 500 to 1,500, wherein a variation coefficient of the number of calcium carbonate particles in partitioning analysis of a cross section of the molded product defined below is 15% or less, and
  wherein a Charpy impact strength at 23±2° C. is 30 kJ/m² or more,
  <Variation coefficient of the number of calcium carbonate particles in partitioning analysis>
  The variation coefficient of the number of calcium carbonate particles in the partitioning analysis is a value calculated by dividing a field of view of a cross section of a molded product into sections, counting the number of calcium carbonate particles in each section, and dividing the standard deviation of the number of particles by the average number of particles in the sections.

2. The polyvinyl chloride-based rigid molded product according to claim 1, wherein the calcium carbonate has been subjected to a fatty acid surface treatment in advance.

3. The polyvinyl chloride-based rigid molded product according to claim 1, used for a product selected from the group consisting of a pipe, a joint, a drainage basin, a gutter, a window frame, a siding, a film-sheet material, a flat plate, and a corrugated plate.

4. The polyvinyl chloride-based rigid molded product according to claim 1, wherein the polyvinyl chloride-based rigid molded product does not include an impact modifier.

5. The polyvinyl chloride-based rigid molded product according to claim 1, wherein the average primary particle size of the calcium carbonate is from 0.01 to 0.15 μm.

6. The polyvinyl chloride-based rigid molded product according to claim 1, wherein a resin composition comprising the polyvinyl chloride-based resin and the calcium carbonate is prepared at a rotational speed of 500 to 3,000 rpm using a rotary mixer; and then is molded by a molding method selected from the group consisting of extrusion molding, press molding, injection molding, and calender molding to manufacture the polyvinyl chloride-based rigid molded product.

7. The polyvinyl chloride-based rigid molded product according to claim 1, further comprising 20 parts by weight or less per 100 parts by weight of the polyvinyl chloride-based resin,
    wherein the heat stabilizer is a barium compound or lead compound.

\* \* \* \* \*